Jan. 22, 1963  M. W. ALTSHULER ETAL  3,074,609
CAKE DOILY
Filed Nov. 22, 1960
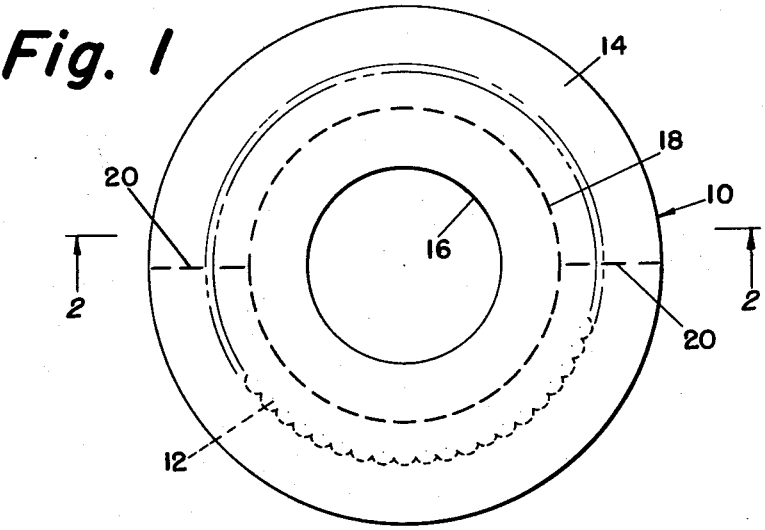
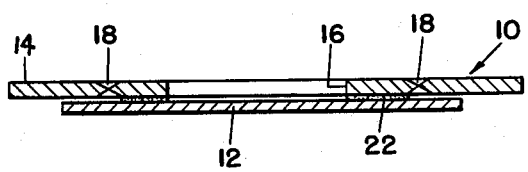
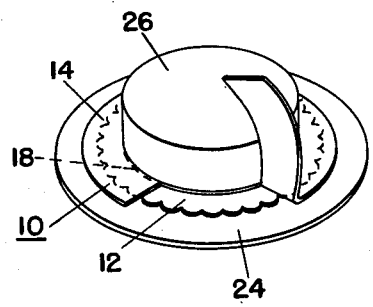
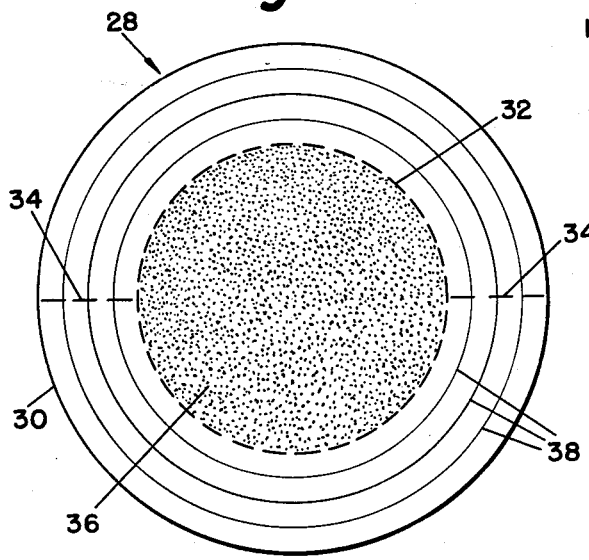
INVENTORS
MORTON W. ALTSHULER
DANIEL E. FRANKLIN
BY
*Donald S. Cohen*
ATTORNEY

3,074,609
CAKE DOILY
Morton W. Altshuler, 50 Boylston St., and Daniel E. Franklin, 97 Moraine St., both of Brockton, Mass.
Filed Nov. 22, 1960, Ser. No. 71,079
6 Claims. (Cl. 229—1.5)

The present invention relates to a cake doily, and more particularly to a protected cake doily for use in icing a cake to prevent damaging the appearacne of the doily.

When serving a cake it is customary to place a decorated doily on the cake plate beneath the cake. Such doilies usually have fancy edging, such as scallops, cut-out patterns, and the like, and are often embossed with a design. The doilies add decoration to the plate, and prevent the cake from sticking to the cake plate for ease of cutting and serving the cake.

When a cake is baked in the home, the cake is usually placed on the doily prior to icing the cake. This minimizes the amount of handling of the iced cake so as to prevent damage to the icing. However, during the icing of the cake, the icing often runs or drips onto the doily, and thereby damages the appearance of the doily.

It is an object of the present invention to provide a novel cake doily.

It is another object of the present invention to provide a protected cake doily for use in icing a cake to prevent damaging the appearance of the doily.

It is a further object of the present invention to provide a protection for a cake doily to prevent damaging the appearance of the doily during the icing of the cake.

Other objects will appear hereinafter.

For the purpose of illustrating the invention there is shown in the drawings forms which are presently preferred; it being understood, however, that this invention is not limited to the precise arrangements and instrumentalities shown.

FIGURE 1 is a top elevational view of the cake doily of the present invention.

FIGURE 2 is a sectional view taken along 2—2 of FIGURE 1.

FIGURE 3 is a perspective view illustrated the manner of using the cake doily of the present invention.

FIGURE 4 is a bottom elevational view of a modification of the protector for the cake doily of the present invention.

Referring initally to FIGURES 1 and 2, the protected cake doily of the present invention is generally designated as 10.

Cake doily 10 comprises a doily sheet 12, which as shown is usually round, but which can be rectangular or any other desired shape. The doily sheet 12 may be made of paper, a plastic, or a woven or knitted material. However, since the doily 10 is used only once, it is preferable to make the doily sheet 12 of paper so that the doily 10 will be inexpensive. As shown, the doily sheet 12 has scalloped or serrated edges. However, the doily sheet 12 may have other types of decorations, such as imitation cut-work edges, and/or embossed designs.

A protection sheet 14 extends over the doily sheet 12. The protection sheet 14 may be of any shape which is largr in area than the area of the doily sheet 12, but as shown, is preferably of a shape similar to the shape of the doily sheet 12. The protection sheet 14 has a central hole 16 therethrough which is of a diameter substantially smaller than the diameter of the doily sheet 12. The protection sheet 14 is also provided with a circular line of perforations 18 concentric with the hole 16, and a pair of perforation lines 20 extending radially from diametrically opposite points along the circular line of perforations 18 to the outer edge of the protection sheet 14. The circular line of perforations 18 is of a diameter smaller than the diameter of the doily sheet 12. The protection sheet 14, like the doily sheet 12, is preferably made of paper. As shown in FIGURE 2, the protection sheet 14 is secured to the doily sheet 12 by a layer 22 of cement, glue or the like. The cement layer 22 extends between the doily sheet 12 and the protection sheet 14 around the edge of the hole 16 in the protection sheet 14, and within the circle of the line of perforations 18. Thus, the protection sheet 14 is secured to the doily sheet 12 only within the circle of the perforated line 18, leaving the marginal portion of the protection sheet 14 outside of the circular line of perforations 18 free from the doily sheet. Although the circular line of perforations 18 is of a diameter smaller than the outer diameter of the doily sheet 12, the circular line of perforations 18 should be of a diameter substantially equal to or slightly greater than the diameter of the cake to be placed on the doily 10.

Referring to FIGURE 3, the doily 10 of the present invention is used as follows:

The doily 10 is placed on a cake plate 24 with the doily sheet 12 being against the cake plate, and the protection sheet 14 being exposed. The uniced cake 26 is placed on the protection sheet 14 of the doily 10, and is centered within the circular line of perforations 18. With the cake 26 being so positioned on the doily 10 of the present invention, the cake 26 is then iced. During the icing of the cake, any drippings or running of the icing will drop or run onto the marginal portion of the protection sheet 14 around the circular line of perforations 18. After the cake 26 is completely iced, the protection sheet 14 is torn along the perforated lines 20 and then along the circular line of perforations 18 as illustrated in FIGURE 3 to remove the marginal portion of the protection sheet 14. When the marginal portion of the protection sheet 14 is removed, the marginal portion of the doily sheet 12 is exposed. Thus, with the removal of the marginal portion of the protection sheet 14, any drippings of the icing are removed leaving the clean marginal portion of the doily sheet 12 exposed for serving the cake.

Many cake doilys are made of a plastic or of a knitted or woven material. Such cake doilys can be washed so that they are reusable. Referring to FIGURE 4, a protection sheet of the present invention for use with a reusable cake doily is generally designated as 28.

Protection sheet 28 comprises a paper sheet 30 of a shape corresponding to the shape of a reusable doily, and of a diameter larger than the diameter of the doily. Sheet 30 is provided with a circular line of perforations 32, and a pair of perforated lines 34 extending radially from diametrically opposite sides of the circular line of perforations 32 to the outer edge of the sheet 30. The circular line of perforations 32 is of a diameter smaller than the diameter of the reusable doily, and of a diameter substantially equal to the diameter of the cake. The bottom side of the sheet 30 is coated within the area of the circular line of perforations 32 with a layer 36 of a pressure sensitive adhesive. The bottom surface of the sheet 30 is also provided with printed circular lines 38 which are concentric to and progressively larger in diameter than the circular of perforations 32. The printed circular lines 38 are of various diameters corresponding to the diameters of standard doilies. A sheet of oiled paper or the like, not shown, may be placed over the pressure sensitive adhesive layer 36 to protect the adhesive until the protection sheet 28 is ready to be used.

The protection sheet 28 is used as follows:

With the pressure sensitive adhesive layer 36 exposed, and the bottom surface of the sheet 30 facing upwardly, a reusable doily is placed over the bottom surface of the sheet 30. The reusable doily can be centered on the sheet 30 by placing the edge of the reusable doily along the printed circular line 38 corresponding to the diameter of the reusable doily. The reusable doily is pressed tightly against the adhesive layer 36 to secure the doily to the protection sheet 28. The protection sheet 28 with the reusable doily secured thereto is then placed on a cake plate in the manner as previously described, and as shown in FIGURE 3. The cake can then be placed on the protection sheet 28 within the circular line of perforations 32, and is then iced. After the cake is iced, the marginal portion of the protection sheet 28 is removed by tearing along the perforated lines 34 and 32 to remove any drippings of the icing, and to expose the clean marginal portion of the reusable doily. After the cake is completely eaten, the central portion of the sheet 30 of the protection sheet 28 can be stripped from the reusable doily to permit washing of the doily. When the doily is to be reused, a new protection sheet 28 can be placed over and secured to the doily. Thus, the reusable doily can be reused with only the protection sheet 28 being destroyed after each use.

The present invention may be embodied in other specific forms without departing from the spirit or essential attributes thereof and, accordingly, reference should be made to the appended claims, rather than to the foregoing specification as indicating the scope of the invention.

We claim:

1. A cake doily comprising a doily sheet, a protection sheet extending over said doily sheet, said protection sheet being of larger area than the area of said doily sheet and completely covering said doily sheet, said protection sheet having a continuous line of perforations encompassing an area smaller than the area of the doily sheet, and means securing said protection sheet to said doily sheet only within the area encompassed by said line of perforations.

2. A doily in accordance with claim 1 in which the protection sheet is provided with at least one additional line of perforations extending from the continuous line of perforations to the edge of the protection sheet.

3. A doily in accordance with claim 2 in which the doily sheet and the protection sheet are each sheets of paper.

4. A cake doily comprising a circular doily sheet, a circular protection sheet extending over and centered with respect to said doily sheet, said protection sheet being of a diameter larger than the diameter of said doily sheet, said protection sheet having a circular line of perforations of a diameter smaller than the diameter of the doily sheet, and means securing said protection sheet to said doily sheet only within the area encompassed by the circular line of perforations.

5. A cake doily in accordance with claim 4 in which the protection sheet has at least one additional line of perforations extending radially from the circular line of perforations to the edge of the protection sheet.

6. A cake doily in accordance with claim 5 in which the doily sheet and the protection sheet are each sheets of paper.

References Cited in the file of this patent

UNITED STATES PATENTS

| | | |
|---|---|---|
| 1,210,230 | Stringer | Dec. 26, 1916 |
| 1,256,818 | Nile | Feb. 19, 1918 |
| 2,363,422 | Hutchings | Nov. 21, 1944 |
| 2,510,120 | Leander | June 6, 1950 |
| 2,552,297 | Stanley | May 8, 1951 |
| 2,829,459 | Halpern | Apr. 8, 1958 |

FOREIGN PATENTS

| | | |
|---|---|---|
| 895,721 | Germany | Sept. 24, 1953 |